United States Patent
Nakai (10) Patent No.: US 12,249,125 B2
(45) Date of Patent: Mar. 11, 2025

(54) LEARNING APPARATUS, METHOD AND COMPUTER READABLE MEDIUM

(71) Applicant: KABUSHIKI KAISHA TOSHIBA, Tokyo (JP)

(72) Inventor: Tomohiro Nakai, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 319 days.

(21) Appl. No.: 17/651,653

(22) Filed: Feb. 18, 2022

(65) Prior Publication Data

US 2022/0383622 A1    Dec. 1, 2022

(30) Foreign Application Priority Data

May 31, 2021    (JP) .................................. 2021-091243

(51) Int. Cl.
| | |
|---|---|
| *G06V 10/774* | (2022.01) |
| *G06N 3/08* | (2023.01) |
| *G06T 7/00* | (2017.01) |
| *G06V 10/764* | (2022.01) |

(52) U.S. Cl.
CPC ............ *G06V 10/774* (2022.01); *G06N 3/08* (2013.01); *G06T 7/0002* (2013.01); *G06V 10/764* (2022.01)

(58) Field of Classification Search
None
See application file for complete search history.

(56) References Cited

U.S. PATENT DOCUMENTS

| | | | |
|---|---|---|---|
| 11,436,528 B2* | 9/2022 | Wang ........................ | G06N 7/01 |
| 2019/0034798 A1* | 1/2019 | Yu ........................... | G06N 3/045 |
| 2021/0118132 A1* | 4/2021 | Kearney ................. | A61C 7/002 |
| 2022/0076074 A1* | 3/2022 | Li ........................... | G06V 10/82 |
| 2022/0147761 A1* | 5/2022 | Tsai ........................ | G06V 10/74 |
| 2022/0207431 A1* | 6/2022 | Park ....................... | G06N 20/20 |

(Continued)

FOREIGN PATENT DOCUMENTS

| | | |
|---|---|---|
| JP | 2016-58079 A | 4/2016 |
| JP | 2020-115273 A | 7/2020 |
| JP | 2020-155101 A | 9/2020 |

(Continued)

OTHER PUBLICATIONS

Liu et al., "Unsupervised Domain Adaptation for Nonintrusive Load Monitoring Via Adversarial and Joint Adaptation Network," IEEE Transactions on Industrial Informatics vol. 18, Issue: 1, Date of Publication: Mar. 17, 2021 (Year: 2021).*

(Continued)

*Primary Examiner* — Soo Shin
(74) *Attorney, Agent, or Firm* — Oblon, McClelland, Maier & Neustadt, L.L.P.

(57) ABSTRACT

According to one embodiment, a learning apparatus includes a processor. The processor acquires first training data. The processor inputs the first training data to a model, and generate a plurality of estimation vectors that are a processing result of the model. The processor generates an estimation distribution from the estimation vectors. The processor calculates a distribution loss between the estimation distribution and a target distribution that is a target in an inference using the model. The processor updates parameters of the model, based on the distribution loss.

15 Claims, 7 Drawing Sheets

(56) References Cited

U.S. PATENT DOCUMENTS

2022/0383994 A1* 12/2022 Rabideau ............... G16C 20/70
2023/0028237 A1* 1/2023 Wei ...................... G06V 10/764

FOREIGN PATENT DOCUMENTS

JP          2021-15425  A    2/2021
JP          2021-81795  A    5/2021

OTHER PUBLICATIONS

Tan, S. et al. "Class-imbalanced Domain Adaptation: An Empirical Odyssey" http://arxiv.org/abs/1910.10320, 2020 (21 pages).
Japanese Office Action issued Apr. 23, 2024 in Japanese Patent Application No. 2021-091243 (with unedited computer-generated English Translation), 6 pages.
Japanese Office Action dated Oct. 1, 2024, issued in Japanese Patent Application No. 2021-091243 (with English translation).

* cited by examiner

LEARNING APPARATUS, METHOD AND COMPUTER READABLE MEDIUM

CROSS-REFERENCE TO RELATED APPLICATIONS

This application is based upon and claims the benefit of priority from Japanese Patent Application No. 2021-091243, filed May 31, 2021, the entire contents of which are incorporated herein by reference.

FIELD

Embodiments described herein relate generally to a learning apparatus, method and computer readable medium.

BACKGROUND

In defective image classification that discriminates a defect of a product or the like by using machine learning, there is a possibility that a previous trained model cannot be utilized because of a generation change of products. For example, due to a change of the shape or manufacturing process of products, there may possibly occur a defect that is different from a defect of a manufacturing process of products of an old generation, such as easy mixing of a contamination in the manufacturing process of new products. In other words, there is a case in which the tendency of data used in the learning changes. To cope with this, there is known a method called domain adaptation, which combines the training data of an old generation (source domain) and the training data of a new generation (target domain), thereby improving a classification precision for the target domain.

However, in the domain adaptation, if the distribution of classification (class distribution) that is assumed is different between the source domain and the target domain, there arises such a problem that the classification precision in the target domain becomes lower. Although there is known a method of domain adaptation using a pseudo-label, the pseudo-label is not necessarily correct. Thus, there is a case in which incorrect learning is performed, and it is difficult to improve the classification precision.

DETAILED DESCRIPTION

In general, according to one embodiment, a learning apparatus includes a processor. The processor acquires first training data. The processor inputs the first training data to a model, and generate a plurality of estimation vectors that are a processing result of the model. The processor generates an estimation distribution from the estimation vectors. The processor calculates a distribution loss between the estimation distribution and a target distribution that is a target in an inference using the model. The processor updates parameters of the model, based on the distribution loss.

Hereinafter, a learning apparatus, method and program according to embodiments will be described in detail with reference to the accompanying drawings. Note that in the embodiments below, parts denoted by identical reference signs are assumed to perform similar operations, and an overlapping description is omitted unless where necessary.

First Embodiment

Figure 1:
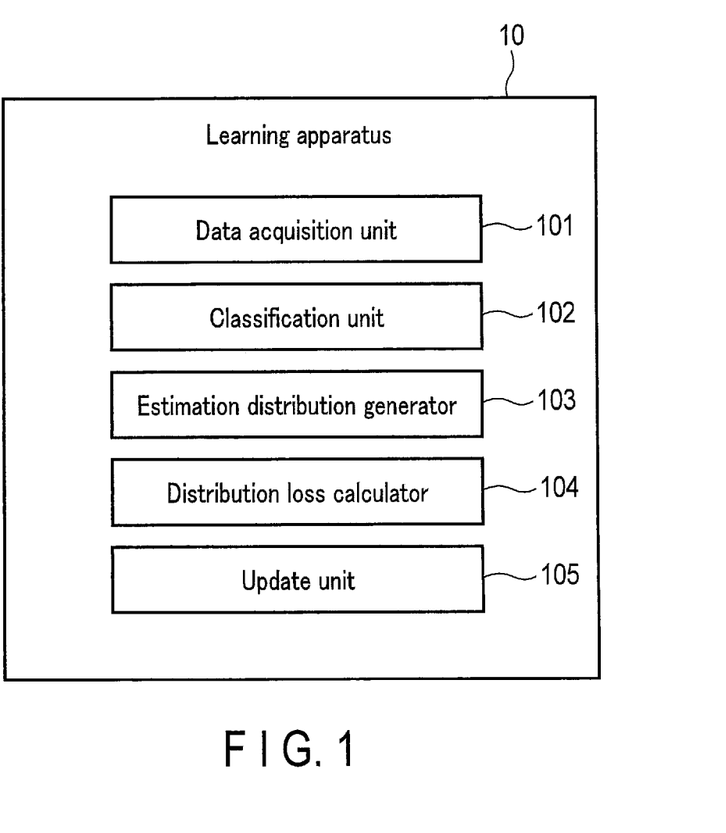
FIG. 1 is a block diagram illustrating a learning apparatus according to a first embodiment.

A learning apparatus according to a first embodiment will be described with reference to a block diagram of FIG. 1.

A learning apparatus 10 according to the first embodiment includes a data acquisition unit 101, a classification unit 102, an estimation distribution generator 103, a distribution loss calculator 104, and an update unit 105.

The data acquisition unit 101 acquires training data from the outside. It is assumed that the training data is data to which no teaching label is given. The training data is data of a target domain that is an object of inference by a trained model.

The classification unit 102 receives the training data from the data acquisition unit 101 and inputs the training data to a model, thereby generating an estimation vector that is a processing result of the model. The estimation vector is a classification result corresponding to an output of the model, which is indicative of a membership probability to each of a plurality of classes. Note that in the embodiments including embodiments following the first embodiment, it is assumed that the "model" is a machine learning model, such as a neural network, which aims at a class classification task, but the embodiments are not limited to this. Specifically, the training process by the learning apparatus 10 according to the present embodiment is similarly applicable to machine learning models that aim at other tasks, such as image recognition and regression.

The estimation distribution generator 103 receives the estimation vector from the classification unit 102, and generates an estimation class distribution (also referred to as "estimation distribution") which is estimated by using the estimation vector in regard to the entirety of the training data.

The distribution loss calculator 104 calculates a distribution loss that is a difference between the estimation class distribution from the estimation distribution generator 103 and a target class distribution (also referred to as "target distribution") that is a target in the inference using the model. The target class distribution is, for example, a distribution of class classification, which is predicted or assumed in the class classification for the data of the target domain.

The update unit 105 acquires the distribution loss from the distribution loss calculator 104, and updates parameters of the model, based on the distribution loss. The update unit 105 ends the update of the parameters of the model, based on a predetermined condition, and thereby a trained model is generated.

Figure 2:
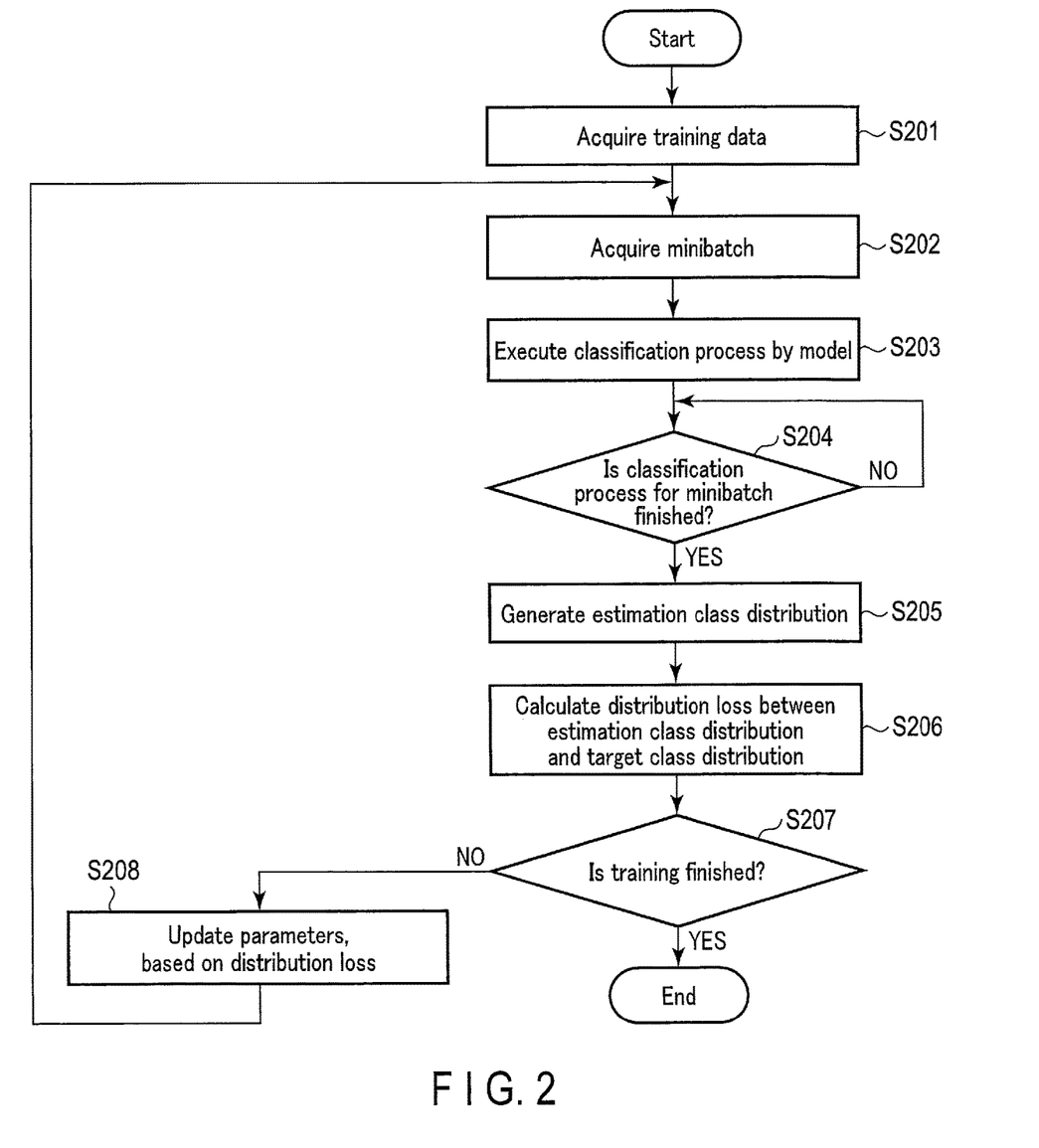
FIG. 2 is a flowchart illustrating an operation of the learning apparatus according to the first embodiment.

Next, an operation of the learning apparatus 10 according to the first embodiment will be described with reference to a flowchart of FIG. 2.

In step S201, the data acquisition unit 101 acquires a plurality of training data. Specifically, as the training data, for example, photography images of products may be used.

In step S202, the classification unit 102 acquires a minibatch $X_t$ of the training data. The minibatch $X_t$ is a subset of data selected from the training data, and a plurality of minibatches are generated from the training data. As regards the generation method of minibatches, a general generation method of minibatches may be used, such as by selecting a predetermined number of data at random from the training data. Here, one of the minibatches generated by an existing method is acquired.

In step S203, a classification process is executed by a model in regard to training data $x_t$ included in the minibatch $X_t$, thereby generating an estimation vector $f_\theta(y|x_t)$. Here, $\theta$ is parameters such as a weight and a bias, which is set in the model. The estimation vector $f_\theta(y|x_t)$ is indicative of which of class classifications the training data $x_t$ corresponds to, and indicative of a ratio of certainty for the corresponding class classification.

Specifically, a case is assumed in which the training data are photography images of products, and a defect classification task of products is executed. It is assumed that a result, [flaw, contamination, stain]= [0.7, 0.2, 0.1], was obtained as the estimation vector, in such a case that a product has a defect, and the defect is classified by estimating, from the photography images, which of a flaw, mixing of contamination and a stain the defect corresponds to. In this case, an estimation vector is obtained which indicates that the possibility that the defect of the product is the flaw is high, i.e., that the certainty that the defect of the product is the flaw is high. In this manner, here, it is assumed that one estimation vector $f_\theta(y|x_t)$ is generated for one training data $x_t$.

In step S204, it is determined whether the classification process is finished in regard to all training data included in the minibatch $X_t$. If the process for all training data included in the minibatch $X_t$ is finished, the process advances to step S205. If there remains unprocessed training data in the minibatch $X_t$, the process of step S204 is repeated.

In step S205, the estimation distribution generator 103 generates an estimation class distribution that is a certainty relating to each class classification in the case of classifying the minibatch $X_t$. The estimation distribution generator 103 may generate, as the estimation class distribution, for example, a mean of estimation vectors generated from all training data included in the minibatch $X_t$, and an estimation class distribution $q^\wedge(y|X_t)$ can be expressed by equation (1). Note that "^" indicates a superior hat, and $q^\wedge$ represents an estimation value of a class distribution.

$$\hat{q}(y|X_t) = \frac{1}{|X_t|} \sum_{x_t \in X_t} f_\theta(y|x_t) \tag{1}$$

Note that the estimation class distribution $q^\wedge(y|X_t)$ is not limited to the mean of estimation vectors $f_\theta(y|x_t)$ and may be calculated by using other statistical value such as a median of elements of the vector.

In step S206, the distribution loss calculator 104 calculates a distribution loss (error) between the estimation class distribution $q^\wedge(y|X_t)$ and a target class distribution $q(y)$, by using KL (Kullback-Leibler) divergence. Note that, aside from the KL divergence, a method that can validate a difference between two probability distributions, such as JS (Jensen-Shannon) divergence, may be used. The target class distribution $q(y)$ may be calculated from, for example, data in which labels that are correct answers are manually given to the data of the same domain as the training data. When a distribution that is a target, or a distribution that is assumed, can be understood for a classification result, the distribution may be used as the target class distribution $q(y)$. Specifically, a distribution loss $L_{dist}(X_t)$ using the Kullback-Leibler divergence can be expressed by equation (2).

$$L_{dist}(X_t) = D(\hat{q}(y|X_t) \| q(y)) \tag{2}$$

Here, $D(q^\wedge(y|X_t)\|q(y))$ of the right side of equation (2) is the Kullback-Leibler divergence calculated by equation (3).

$$D(\hat{q}(y|X_t) \| q(y)) = \sum_{y \in Y} \hat{q}(y|X_t) \log\left(\frac{\hat{q}(y|X_t)}{q(y)}\right) \tag{3}$$

In step S207, the update unit 105 determines whether or not the training is finished. As regards the determination of the end of training, for example, the end of training may be determined when a predetermined epoch number of training is finished, or the end of training may be determined when the distribution loss $L_{dist}(X_t)$ is equal to or less than a threshold. When the training is finished, the update of parameters is ended and the process is finished. Thereby, a trained model is generated. On the other hand, when the training is not finished, the process advances to step S208.

In step S208, the update unit 105 updates parameters (the weight and bias of the neural network, and the like) of the model, for example, by a gradient descent method and an error backpropagation method, or the like, such that the distribution loss $L_{dist}(X_t)$ becomes minimum. Thereafter, the process returns to step S202, and the process of step S202 to step S208 is executed on minibatches that are yet to be processed.

According to the above-described first embodiment, the distribution loss between the estimation class distribution and the target class distribution is calculated, and the parameters of the model are trained based on the distribution loss. Thereby, even if labels are not given to the training data, appropriate training can be executed, and the precision of training can be improved. In the present embodiment, the classification precision can be improved, compared to a trained model that is trained by general unsupervised learning.

Second Embodiment

A second embodiment is different from the first embodiment in that the target class distribution is generated from training data with teaching labels.

Figure 3:
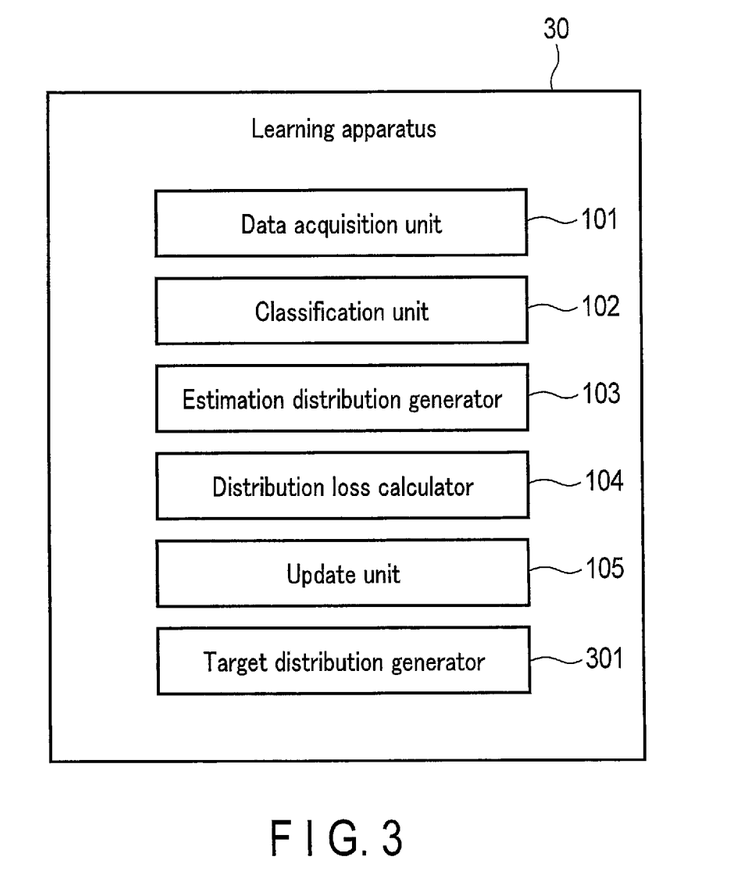
FIG. 3 is a block diagram illustrating a learning apparatus according to a second embodiment.

A learning apparatus according to the second embodiment will be described with reference to a block diagram of FIG. 3.

A learning apparatus 30 according to the second embodiment includes a data acquisition unit 101, a classification unit 102, an estimation distribution generator 103, a distribution loss calculator 104, an update unit 105, and a target distribution generator 301.

The classification unit 102, estimation distribution generator 103, distribution loss calculator 104 and update unit 105 are similar to those of the first embodiment, and thus a description thereof is omitted.

The data acquisition unit 101 acquires, in addition to the training data (hereinafter referred to "first training data") acquired in the first embodiment, training data (hereinafter "second training data") to which teaching labels are given. The second training data is the data of the same domain as the first training data, and is, for example, data to which teaching labels are manually given in regard to a part of the first training data.

The target distribution generator 301 receives the second training data and teaching labels from the data acquisition unit 101, and generates a target class distribution, based on the teaching labels.

Next, an operation of the learning apparatus according to the second embodiment will be described with reference to FIG. 4.

Since step S201 to step S208 are the same as those in the first embodiment, a description thereof is omitted.

In step S401, the data acquisition unit 101 acquires a plurality of second training data with teaching labels.

In step S402, the target distribution generator 301 generates a target class distribution, based on the teaching labels. For example, a frequency distribution, in which the number for each teaching label class is divided by the total number of teaching labels, may be used as the target class distribution. Note that in the case of the target class distribution, like the case of the estimation class distribution, the distribution of class classifications may be calculated by some other statistical quantity.

In step S206, the distribution loss calculator 104 may calculate the distribution loss between the target class distribution and the estimation class distribution, based on the target class distribution calculated in step S402.

According to the above-described second embodiment, the target class distribution is generated from the second training data with teaching labels. Thereby, like the first embodiment, even if labels are not given to the first training data, appropriate training can be executed, and the precision of training can be improved.

Third Embodiment

A third embodiment is different from the second embodiment in that an entropy loss between estimation vectors at a time of generating the estimation class distribution is calculated.

Figure 5:
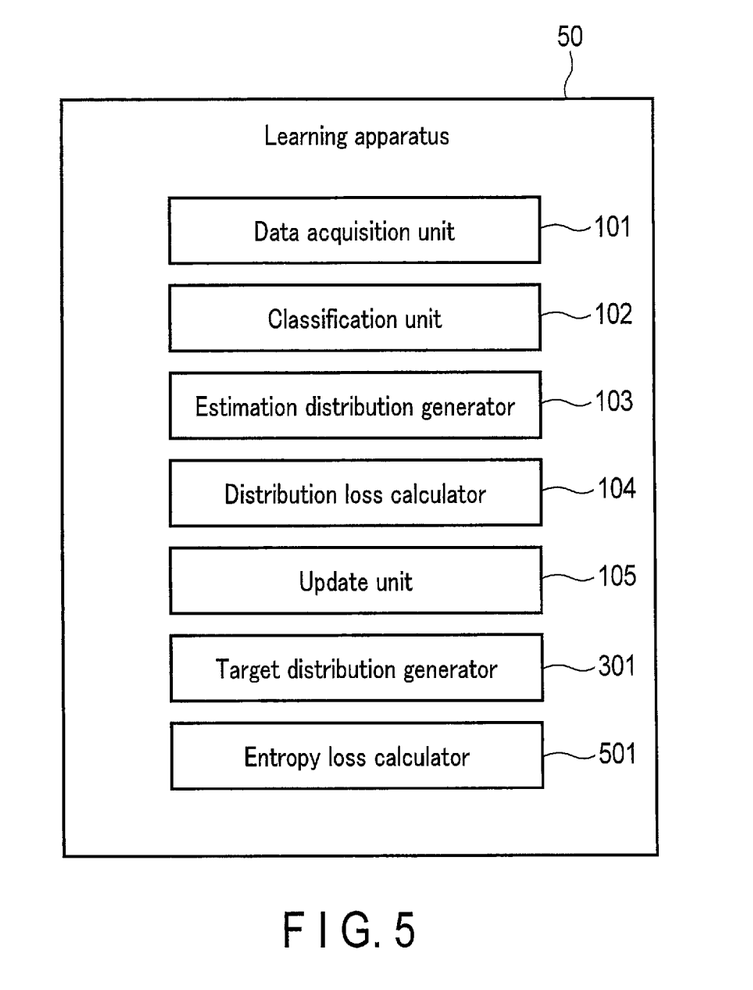
FIG. 5 is a block diagram illustrating a learning apparatus according to a third embodiment.

A learning apparatus according to the third embodiment will be described with reference to a block diagram of FIG. 5.

A learning apparatus 50 according to the third embodiment includes a data acquisition unit 101, a classification unit 102, an estimation distribution generator 103, a distribution loss calculator 104, an update unit 105, a target distribution generator 301, and an entropy loss calculator 501.

The data acquisition unit 101, classification unit 102, estimation distribution generator 103, distribution loss calculator 104 and target distribution generator 301 are similar to those of the first and second embodiments, and thus a description thereof is omitted.

The entropy loss calculator 501 receives a plurality of estimation vectors from the classification unit 102, and calculates an entropy loss between the estimation vectors. The entropy is indicative of a deviation of estimation vectors. If only the update based on the distribution loss is executed, there is a possibility that an individual estimation vector estimated from one training data is also trained so as to become closer to the target class distribution, and the estimation becomes ambiguous. For the individual training data, training such as "this class is close to 1 and other classes are zero" is executed, and thereby the estimation with certainty is executed for individual training data, and training can be executed in such a manner as to become closer to the target class distribution as a whole. Thus, the classification precision can be improved by adding an entropy loss in order to give a penalty to ambiguous estimation.

The update unit 105 receives the entropy loss from the entropy loss calculator 501 and receives the distribution loss from the distribution loss calculator 104, and the update unit 105 updates the parameters of the model, based on the entropy loss and the distribution loss.

Figure 6:
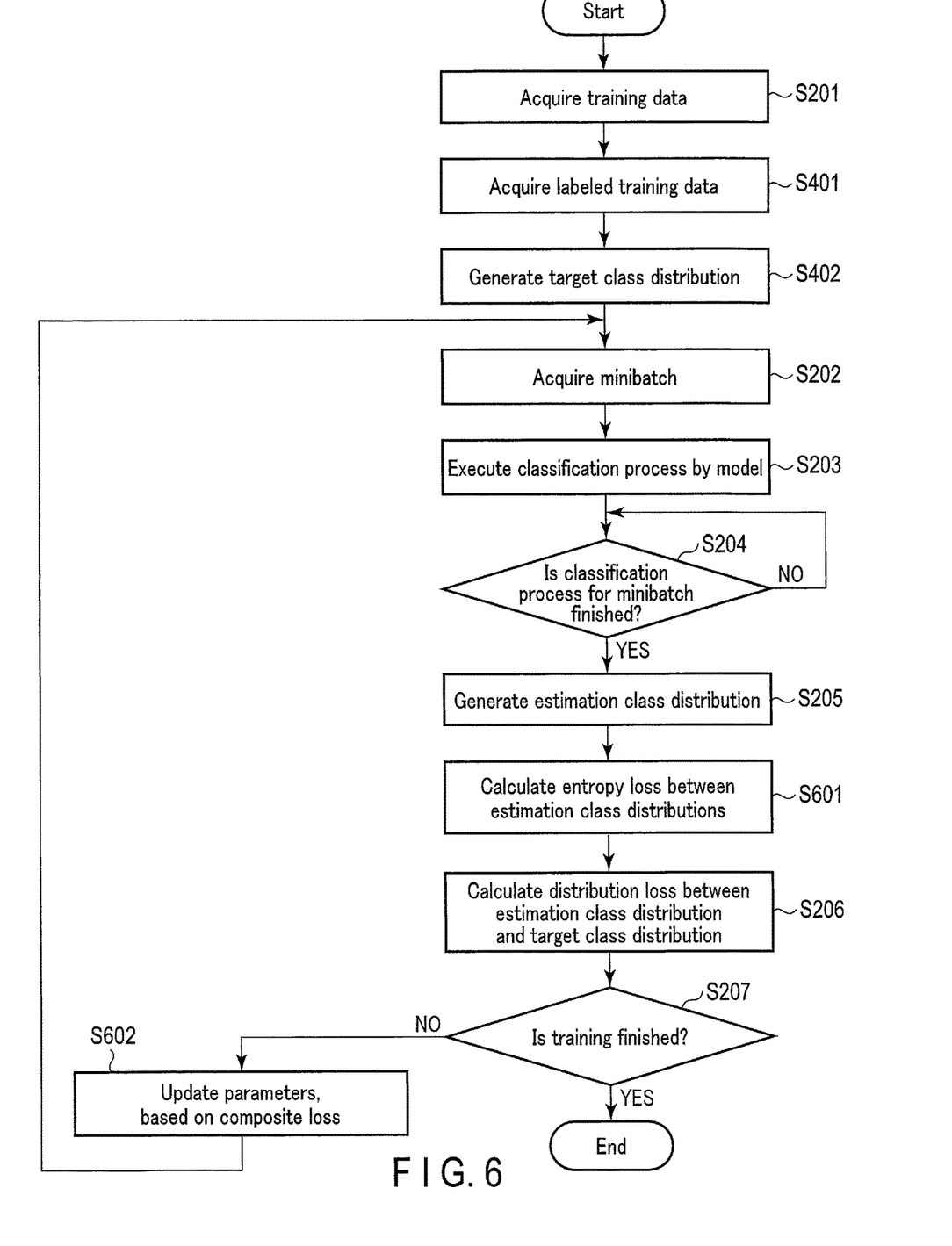
FIG. 6 is a flowchart illustrating an operation of the learning apparatus according to the third embodiment.

An operation of the learning apparatus 50 according to the third embodiment will be described with reference to a flowchart of FIG. 6.

Figure 4:
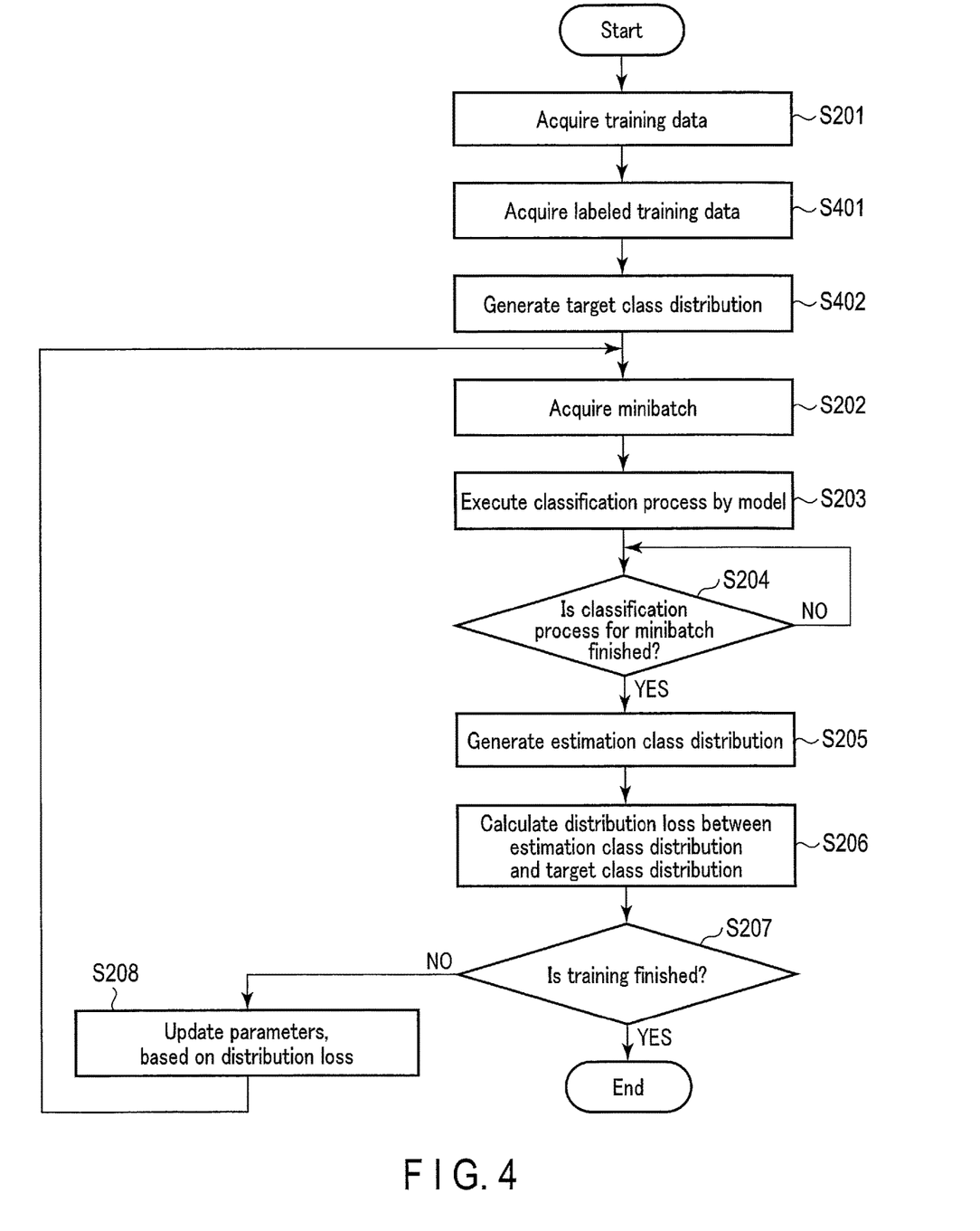
FIG. 4 is a flowchart illustrating an operation of the learning apparatus according to the second embodiment.

Since the steps, other than step S207, step S601 and step S602, are the same as the steps in the flowchart of FIG. 4, a description thereof is omitted.

In step S601, the entropy loss calculator 501 calculates the entropy loss, based on the estimation vectors. An entropy loss $L_{ent}(X_t)$ relating to an occurrence probability Y of each class of the estimation vectors is expressed by, for example, equation (4).

$$L_{ent}(X_t) = -\frac{1}{|X_t|} \sum_{x_t \in X_t} \sum_{y \in Y} f_\theta(y|x_t) \log f_\theta(y|x_t) \qquad (4)$$

In step S207, the update unit 105 determines whether the training is finished, based on the distribution loss $L_{dist}(X_t)$ and the entropy loss $L_{ent}(X_t)$. For example, if a composite loss $L(X_t)$ indicated in equation (5), which is the sum of the distribution loss $L_{dist}(X_t)$ and the entropy loss $L_{ent}(X_t)$, is equal to or less than a threshold, the training is finished. If the composite loss $L(X_t)$ is greater than the threshold, the process goes to step S602.

$$L(X_t) = L_{ent}(X_t) + L_{dist}(X_t) \qquad (5)$$

Alternatively, as expressed in equation (6), a weighted sum between the distribution loss $L_{dist}(X_t)$ and the entropy loss $L_{ent}(X_t)$ may be calculated as the composite loss $L(X_t)$. Here, $\alpha$ and $\beta$ are arbitrary real numbers.

$$L(X_t) = \alpha L_{ent}(X_t) + \beta L_{dist}(X_t) \qquad (6)$$

In step S602, the update unit 105 updates the parameters such that the composite loss is minimized, based on the composite loss of equation (5) or equation (6). In addition, when the composite loss is calculated by the weighted sum between the entropy loss and distribution loss, the parameters may be updated such that a loss with a greater weight is preferentially minimized in accordance with the weight.

According to the above-described third embodiment, the entropy loss of the estimation vectors is calculated, and the parameters are updated by using the distribution loss and the entropy loss. By using the entropy loss, a penalty can be given to the ambiguous estimation, and the learning precision of the model can be enhanced.

Fourth Embodiment

In a fourth embodiment, an example is illustrated in which an inference is executed by an inference apparatus including the trained model that was trained by the learning apparatus of any one of the first embodiment to third embodiment.

Figure 7:
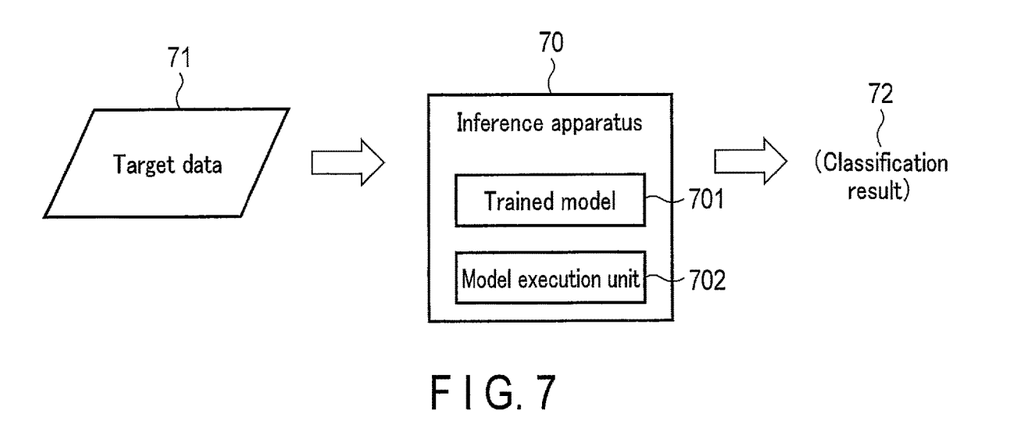
FIG. 7 is a conceptual view of an operation of an inference apparatus according to a fourth embodiment.

FIG. 7 is a conceptual view of an operation of an inference apparatus 70 according to the fourth embodiment.

As illustrated in FIG. 7, the inference apparatus 70 includes a trained model 701 that was trained by the learning apparatus according to each of the above embodiments, and a model execution unit 702.

If target data 71, which is an object of inference, is input to the inference apparatus 70, the model execution unit 702 executes an inference using the trained model with respect to the target data 71, and outputs, as an inference result, a classification result 72 that is indicative of a probability of class classification in regard to the target data 71.

According to the above-described fourth embodiment, the inference (e.g. class classification) with high precision can be executed by executing the inference by using the trained model trained in each of the above-described embodiments.

Figure 8:
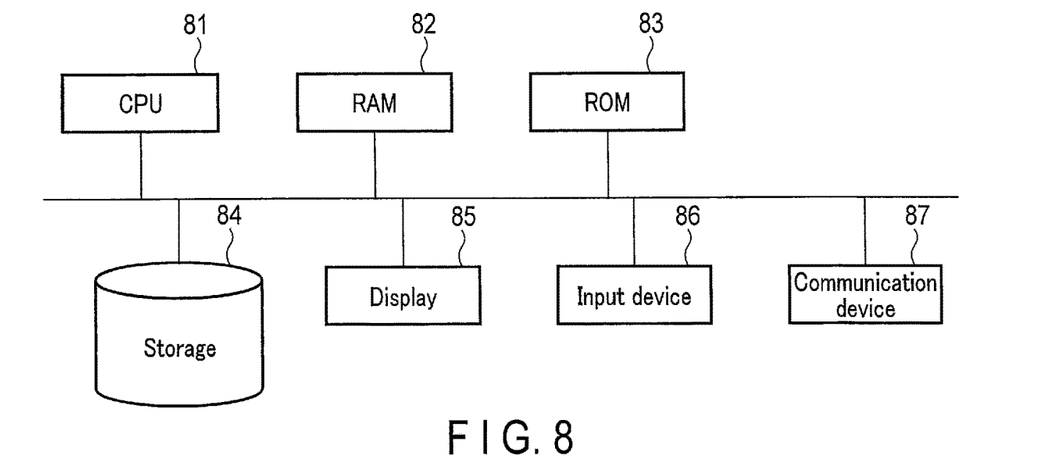
FIG. 8 is a block diagram illustrating an example of a hardware configuration of the learning apparatus according to the embodiments.

Next, an example of a hardware configuration of the learning apparatus 10 and inference apparatus 70 according to the above embodiments is illustrated in FIG. 8.

Each of the learning apparatus 10 and the inference apparatus 70 includes a CPU (Central Processing Unit) 81, a RAM (Random Access Memory) 82, a ROM (Read Only Memory) 83, a storage 84, a display 85, an input device 86 and a communication device 87, and these components are connected by a bus.

The CPU 81 is a processor which executes an arithmetic process and a control process, or the like, according to programs. The CPU 81 uses a predetermined area of the RAM 82 as a working area, and executes various processes of the respective components of the above-described learning apparatus 10 and inference apparatus 70 in cooperation with programs stored in the ROM 83 and storage 84, or the like.

The RAM 82 is a memory such as an SDRAM (Synchronous Dynamic Random Access Memory). The RAM 82 functions as the working area of the CPU 81. The ROM 83 is a memory which stores programs and various information in a non-rewritable manner.

The storage 84 is a device which writes and reads data to and from a magnetic recording medium such as an HDD (Hard Disc Drive), a semiconductor storage medium such as a flash memory, a magnetically recordable storage medium such as an HDD, an optically recordable storage medium, or the like. The storage 84 writes and reads data to and from the storage medium in accordance with control from the CPU 81.

The display 85 is a display device such as an LCD (Liquid Crystal Display). The display 85 displays various information, based on a display signal from the CPU 81.

The input device 86 is an input device such as a mouse and a keyboard, or the like. The input device 86 accepts, as an instruction signal, information which is input by a user's operation, and outputs the instruction signal to the CPU 81.

The communication device 87 communicates, via a network, with an external device in accordance with control from the CPU 81.

The instructions indicated in the processing procedures illustrated in the above embodiments can be executed based on a program that is software. A general-purpose computer system may prestore this program, and may read in the program, and thereby the same advantageous effects as by the control operations of the above-described learning apparatus and inference apparatus can be obtained. The instructions described in the above embodiments are stored, as a computer-executable program, in a magnetic disc (flexible disc, hard disk, or the like), an optical disc (CD-ROM, CD-R, CD-RW, DVD-ROM, DVD±R, DVD±RW, Blu-ray (trademark) Disc, or the like), a semiconductor memory, or other similar storage media. If the storage medium is readable by a computer or an embedded system, the storage medium may be of any storage form. If the computer reads in the program from this storage medium and causes, based on the program, the CPU to execute the instructions described in the program, the same operation as the control of the learning apparatus and inference apparatus of the above-described embodiments can be realized. Needless to say, when the computer obtains or reads in the program, the computer may obtain or read in the program via a network.

Additionally, based on the instructions of the program installed in the computer or embedded system from the storage medium, the OS (operating system) running on the computer, or database management software, or MW (middleware) of a network, or the like, may execute a part of each process for implementing the embodiments.

Additionally, the storage medium in the embodiments is not limited to a medium which is independent from the computer or embedded system, and may include a storage medium which downloads, and stores or temporarily stores, a program which is transmitted through a LAN, the Internet, or the like.

Additionally, the number of storage media is not limited to one. Also when the process in the embodiments is executed from a plurality of storage media, such media are included in the storage medium in the embodiments, and the media may have any configuration.

Note that the computer or embedded system in the embodiments executes the processes in the embodiments, based on the program stored in the storage medium, and may have any configuration, such as an apparatus composed of any one of a personal computer, a microcomputer and the like, or a system in which a plurality of apparatuses are connected via a network.

Additionally, the computer in the embodiments is not limited to a personal computer, and may include an arithmetic processing apparatus included in an information processing apparatus, a microcomputer, and the like, and is a generic term for devices and apparatuses which can implement the functions in the embodiments by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising a processor configured to:
   acquire first training data;
   input the first training data to a model, and generate a plurality of estimation vectors that are a processing result of the model;
   generate an estimation distribution from the estimation vectors;
   calculate a distribution loss between the estimation distribution and a target distribution that is a target in an inference using the model;
   calculate an entropy loss from the estimation vectors; and
   update parameters of the model, based on the entropy loss and the distribution loss.

2. The apparatus according to claim 1, wherein the processor updates the parameters by executing weighting between the entropy loss and the distribution loss.

3. The apparatus according to claim 1, wherein the processor is further configured to:
acquire second training data of an identical domain to the first training data, and a label that is given to the second training data; and
generate the target distribution, based on the label.

4. The apparatus according to claim 3, wherein the processor generates a frequency distribution of the label as the target distribution.

5. The apparatus according to claim 1, wherein
the processor generates a plurality of estimation vectors by inputting the first training data to the model by a minibatch, and generates a statistical value of the estimation vectors as the estimation distribution.

6. The apparatus according to claim 1, wherein the processor calculates a Kullback-Leibler divergence between the estimation distribution and the target distribution as the distribution loss.

7. The apparatus according to claim 1, wherein a trained model is generated by the processor ending the update of the parameters, based on a predetermined condition.

8. A training method comprising:
acquiring first training data;
inputting the first training data to a model, and generating a plurality of estimation vectors that are a processing result of the model;
generating an estimation distribution from the estimation vectors;
calculating a distribution loss between the estimation distribution and a target distribution that is a target in an inference using the model;
calculating an entropy loss from the estimation vectors; and
updating parameters of the model, based on the entropy loss and the distribution loss.

9. The method according to claim 8, wherein the updating updates the parameters by executing weighting between the entropy loss and the distribution loss.

10. The method according to claim 8, further comprising acquiring second training data of an identical domain to the first training data, and a label that is given to the second training data; and
generating the target distribution, based on the label.

11. The method according to claim 10, comprising generating a frequency distribution of the label as the target distribution.

12. The method according to claim 8, wherein
the generating generates a plurality of estimation vectors by inputting the first training data to the model by a minibatch, and generates a statistical value of the estimation vectors as the estimation distribution.

13. The method according to claim 8, wherein the calculating calculates a Kullback-Leibler divergence between the estimation distribution and the target distribution as the distribution loss.

14. The method according to claim 8, wherein a trained model is generated by ending the update of the parameters, based on a predetermined condition.

15. A non-transitory computer readable medium including computer executable instructions, wherein the instructions, when executed by a processor, cause the processor to perform a learning method comprising:
acquire first training data;
input the first training data to a model, and generate a plurality of estimation vectors that are a processing result of the model;
generate an estimation distribution from the estimation vectors;
calculate a distribution loss between the estimation distribution and a target distribution that is a target in an inference using the model;
calculate an entropy loss from the estimation vectors; and
update parameters of the model, based on the entropy loss and the distribution loss.

* * * * *